H. D. YATES.
WET SEPARATOR FOR DUST REMOVING APPARATUS.
APPLICATION FILED JULY 16, 1910.

1,011,550.

Patented Dec. 12, 1911.
3 SHEETS—SHEET 1.

Fig. 1.

UNITED STATES PATENT OFFICE.

HOWARD D. YATES, OF BRADFORD, PENNSYLVANIA.

WET SEPARATOR FOR DUST-REMOVING APPARATUS.

1,011,550. Specification of Letters Patent. Patented Dec. 12, 1911.

Application filed July 16, 1910. Serial No. 572,317.

*To all whom it may concern:*

Be it known that I, HOWARD D. YATES, a citizen of the United States, residing at Bradford, in the county of McKean and State of Pennsylvania, have invented certain new and useful Improvements in Wet Separators for Dust-Removing Apparatus, of which the following is a specification.

This invention relates to dust removing apparatus of the kind comprising a nozzle provided with an inlet slot adapted to be passed over the object to be cleaned and means for producing a partial vacuum back of the inlet for the purpose of carrying off the dust laden air.

In such an apparatus it is convenient to place a dust collecting device intermediate the nozzle inlet and the suction device in order that the latter may not become clogged by the accumulated dust.

It is the purpose of my invention to provide a vacuum cleaning apparatus having a wet separator with means whereby a portion of the liquid contents of the separator is periodically and automatically removed and a fresh supply of clean water periodically and automatically introduced, so that the apparatus does not require any attention but works constantly and automatically after having been once set in operation.

In the drawings Fig. 2 is an enlarged longitudinal vertical section and partial side elevation of the air control valve.

In the drawings 10 is a casing made of sheet metal or other suitable material, provided with a peep hole device indicated at 11, resting on suitable supports 12, and having a cover 13 and a conical bottom 14. These parts are all secured together in any usual manner as by bolts or rivets.

The conical bottom 14 is connected to a line of piping comprising a pipe 15 leading from the cleansing nozzles (not shown), a check valve 16, a T-pipe 17 leading to the bottom 14, a hand-operated valve 18, a pipe 19 leading to the sewer or other place of discharge, a pipe 20 leading to the interior of the casing 10 and a check valve 21 intermediate the pipes 20 and 19. Intermediate pipes and fittings make up the remainder of this line of piping as shown in the drawings.

A pipe 22 of smaller diameter than the line of piping just described leads to the interior of the casing 10 from a constant source of water supply such as a city main. It is controlled by a hand operated valve indicated at 23 and an automatically operated valve (presently to be described) indicated at 24. Arranged above the cover 13 is a valve casing 25 communicating with the interior of the casing 10 on the one hand and with a suction pipe 26 on the other hand.

Secured centrally within the casing 10 by means of plates 33 or in any other usual manner is a framework indicated at 30 and shown in the form of a vertical cylinder provided near its top with a series of air holes 31 whereby it communicates with the air in the upper part of the casing 10. At its bottom it has guide members 32 for a vertically arranged valve rod 34 which also passes through an air tight stuffing box or guide 35 arranged in the top of the cover 13. This rod is provided with two stop members 36 and 37 spaced apart a suitable distance and between them is surrounded by a conical hollow float 38. A third stop 39 serves to limit the upward travel of the rod.

Arranged within the conical bottom 14 is a bubble breaking device comprising a sub-frame 40 depending from the frame work 30 below the guides 32 and provided with projecting fins or baffle plates 41, suitably arranged in the path of the upwardly moving dust laden air current.

Within the casing 25 are arranged the means for controlling the admission of air into the casing 10. Within this casing (see Fig. 2) is a chamber A communicating with the interior of the casing 10, a chamber B communicating with the suction pipe 26 and a chamber C. At the left of the chamber A and secured to the casing 25 by bolts 46, or in any other suitable manner, is a housing 47 having openings 48, 48 leading from the outer air, and other openings 49, 49 leading into the chamber A. A port 50 between these two sets of openings is controlled by a valve 51 adapted to fit snugly against the surface 52 of the housing to form a valve seat. This valve has two valve rods, one 53 which projects outside of the housing and is provided with a coiled retraction spring 110 indicated at 54 and another 55 which is secured to a valve head 56 made integral with or secured to a cylindrical piston 57 adapted to be reciprocated within the chamber C, and which valve head 56 fits tightly against the surface 59 to close the passage way between the chambers A and B.

Figure 1:
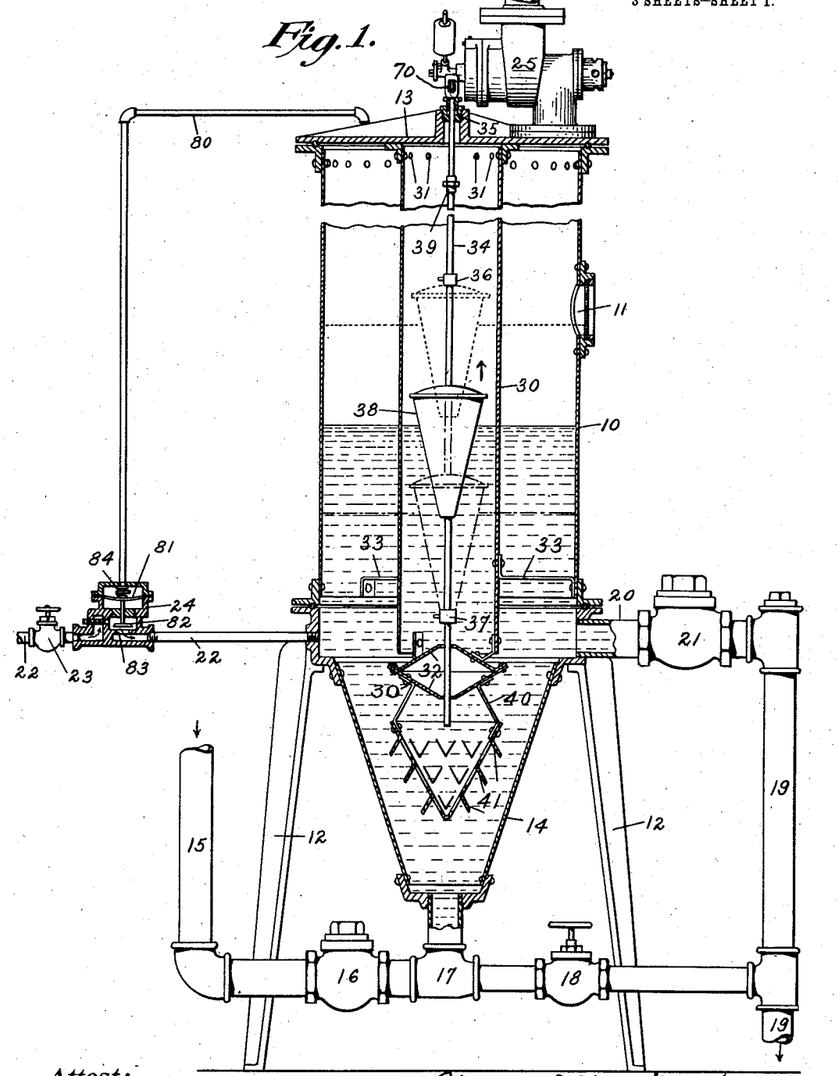
Figure 1 is an elevation and partial central vertical section of an apparatus embodying the invention.
Figure 3:
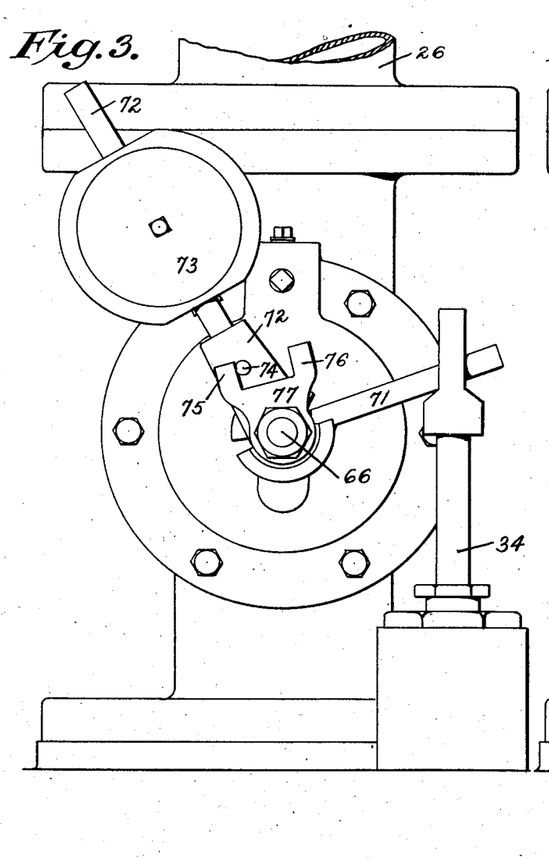
Fig. 3 is a side elevation of the operating connections for such valve and Fig. 4 is a section through the valve mechanism on the plane of the line 4—4 in Fig. 2.
Figure 4:
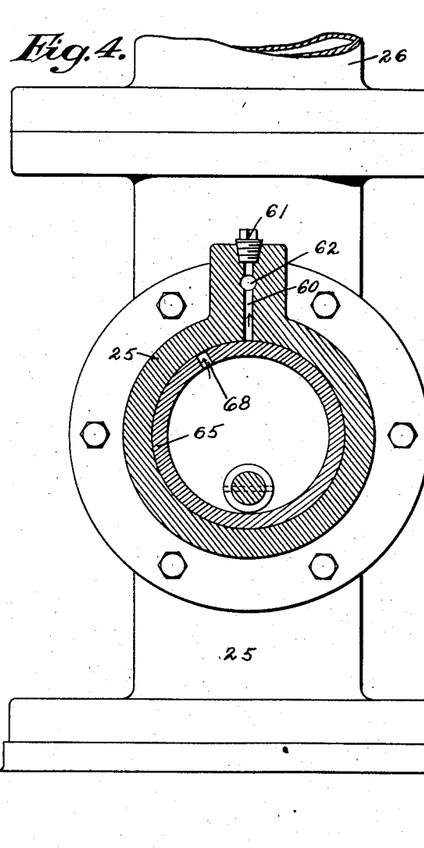

To the right of the chamber C (see Fig. 2) the casing 25 is restricted and provided with a passage 60 leading to the outer air and normally closed by a threaded plug 61. It is also provided with a passage 62 leading from the outer air to the chamber B and normally closed by a threaded plug 63. A third normally open passage 64 leads from the outer air to the chamber C, which latter communicates with the chamber B through port 60 when the hole 68, in valve 65 registers with this port, which allows the action of the vacuum on valve 57 to draw the same to the right and open the passage between chambers B and C. Within the restricted portion of the casing 25 there is placed an annular valve 65 having a stem 66 projecting through the casing through a stuffing box 67. This valve is provided with two ports, one 68 in its annulus adapted to register with the passage 60 and the other 69 in its face adapted to register periodically with the passage 64. The means provided for oscillating this valve 65 are as follows: The upper end of the rod 34 is provided with a slot 70 in which there is engaged one member 71 of an L lever the other member 72 of which is provided with an adjustable weight 73 of any suitable form, such for instance as shown in Fig. 2 or Fig. 3, and which lever is adapted to swing loosely on the valve stem 66. Projecting from the member 72 is a lug 74 adapted to contact with the inner edges of the arms 75 and 76 of a trip 77 which is rigidly secured to the valve stem 66.

A pipe 80 leads from the interior of the casing 10 to the valve 24 within which is arranged a diaphragm 81 provided with a valve 82 adapted to control a port 83. A spring 84 serves to press the valve normally downward.

The mode of operating the device is as follows:—The valve 23 is opened and the valve 18 is closed and a stream of water enters the casing 10 through the pipe 22 and begins to fill up the conical bottom 14. After this bottom has been partly or wholly filled with water the suction pump or other vacuum creating means is put into operation and the air being sucked away through the pipe 26 a partial vacuum is created throughout the apparatus. This vacuum existing in the pipe 80 elevates the diaphragm 81 of the valve 24 and keeps the valve 82 away from its seat against the tension of the spring 84 and allows the flow of water through the pipe 22 to continue. As the dust laden air enters the apparatus through the pipes 15, valve 16 and fitting 17 and passes upward through the apparatus, the large bubbles which tend to form are broken up by contact with the fins or baffle plates 41, and the dirt is left in the water while the air continues to flow through the valve casing 25 into the pipe 26. As the dirty water rises it finally reaches the float 38 and lifts it upward along the rod 34 until the top of the float strikes the stop 36, when the further upward movement of the float is communicated to the rod 34 and it is in turn elevated. As it continues to rise, it tilts the arm 71 of the L-lever until the center of gravity of the weight 73 is carried past the vertical when it suddenly falls to the left (see Fig. 3) and strikes the arm 75 of the trip 77. This in turn oscillates the annular valve 65 until its port 69 is in register with the passageway 64 of the casing 25, and the chamber C is thus connected with the outside air. Now the cylindrical piston 57 has been at the extreme right of the chamber C (see Fig. 2) and under the influence of the partial vacuum in the chambers A and B and the passageway between these two chambers has been open to permit the passage of the air from within the casing 10 to the suction pipe 26, and the valve 51 has been sealed snugly against the surface 52 of the housing 47. When therefore a connection is made between the chamber C and the outer air as has just been described, the latter entering this chamber C forces the cylindrical piston 57 to the left and into the position shown in Fig. 2, which brings the valve head 56 against the seat 59 and closes the passage way between the chambers B and A and cutting off communication from the casing 10 to the suction pipe 26. At the same time the valve 51 has been moved to the left and communication has been established between the casing 10 and the outer air through the chamber A and openings 48 and 49. As the air is admitted to the casing 10 its pressure forces the water through the pipe 20, the check valve 21 and pipe 19 into the sewer or other place of discharge, the check valve 16 holding it against backward flow into the pipe 15. In the meantime the vacuum within the pipe 80 having been destroyed the valve 82 is forced to its seat by the action of the spring 84 and the supply of water through the pipe 22 is automatically cut off. As the level of the water falls, the float 38 falls with it until its lower extremity strikes the stop 37 and thereafter it carries the rod 34 down with it. As this downward movement continues the arm 71 of the L-lever is pulled downward until the center of gravity of the weight 73 passes the vertical when the lever suddenly moves to the left and the arm 72 striking the trip arm 76 oscillates the disk valve 65 until the port 68 registers with the passageway 60 and establishes a connection through from the chamber C to the chamber B and suction pipe 26. The suction in the pipe assisted by the atmospheric pressure within the casing 25 and by the spring 54 automatically moves the cylindrical piston 57 to the right (Fig. 2) and with it the valve head 56 and reëstablishes the connection between the chambers A and B, at the same time moving the valve 51 to close the connection between the chamber A and the outer air through the ports 48 and 49. As the suction is set up in the casing the diaphragm 81 of the valve 24 is lifted and the flow of water through the pipe 22 is automatically secured. The water again rises within the casing 10 and the cycle of described steps is repeated, the whole operation being automatic.

By varying the position of the stops 36 and 37 along the rod 34, which may readily be done by the means provided for that purpose, for instance a set screw, the automatic discharge of the water can be secured at any predetermined height within the casing. Similarly varying the length of the slot in the rod 34, and the position of the weight 73 on the L-lever and the position of the valve 51, and the tension of the springs 54 and 84 almost any desired degree of sensitiveness can be secured for the apparatus.

What I claim as new is:—

1. A separator for vacuum cleaning apparatus comprising means for the introduction of clean water and the discharge of dirty water, and means for mixing the water with the dust laden air, in combination with automatic means for interrupting the introduction of water and the mixing of the air therewith, discharging the dirty water, restoring the air current and reintroducing the water.

2. A separator for vacuum cleaning apparatus comprising means for the introduction of clean water and the discharge of dirty water, and means for mixing the water with the dust laden air, in combination with automatic means for interrupting the introduction of water and the mixing of the air therewith, discharging the dirty water, restoring the air current and reintroducing the water, actuated by the flow of the water through the apparatus.

3. In a device of the character described, a water holding chamber, means for introducing dust laden air therein below the water level, means for producing a partial vacuum above the water level, and means for breaking the vacuum when the water has reached a predetermined height.

4. In a device of the character described, a water holding chamber, means for introducing dust laden air therein, means for producing a partial vacuum above the water level, and means for breaking the vacuum when the water has reached a predetermined height and recreating it when the water has descended to a predetermined level.

5. In a device of the character described, a water holding chamber, means for introducing dust laden air therein below the water level, means for producing a partial vacuum above the water level, and means for breaking the vacuum when the water has reached a predetermined height actuated by the rising of the water.

6. In a device of the character described, a water holding chamber, means for introducing dust laden air therein, means for producing a partial vacuum above the water level, and means for breaking the vacuum when the water has reached a predetermined height and recreating it when the water has descended to a predetermined level actuated by the rising and falling of the water.

7. In a device of the character described, a water holding chamber, means for introducing dust laden air therein below the water level, means for producing a partial vacuum above the water level, and means for breaking the vacuum when the water has reached a predetermined height consisting of a float and a valve controlling the passage of the air through the water controlled by the float.

8. A separator for vacuum cleaning apparatus comprising means for the introduction of clean water and the discharge of dirty water, and means for mixing the water with the dust laden air, in combination with automatic means for interrupting the introduction of water and the mixing of the air therewith, discharging the dirty water, restoring the air current and reintroducing the water including a float moved by the water.

9. A separator for vacuum cleaning apparatus comprising means for the introduction of clean water and the discharge of dirty water, and means for mixing the water with the dust laden air, in combination with automatic means for interrupting the introduction of the water and the mixing of the air therewith, discharging the dirty water, restoring the air current and reintroducing the water, including a float moved by the water and a valve adapted to interrupt and restore the air current, controlled by the float.

10. An apparatus of the character described, comprising an air tight chamber, means for introducing water therein, means for drawing dust laden air through the water and creating a partial vacuum within the chamber, a valve controlling the air drawing means, a valve controlling the water introducing means, and means for automatically actuating both valves.

11. An apparatus of the character described, comprising an air tight chamber, means for introducing water therein, means for drawing dust laden air through the water and creating a partial vacuum within the chamber, a valve controlling the air drawing means, a valve controlling the water introducing means, and means for actuating both valves whereby the vacuum within the chamber is destroyed and the supply of water cut off.

12. An apparatus of the character described, comprising an air tight chamber, means for introducing water therein, means for drawing dust laden air through the water and creating a partial vacuum within the chamber, automatic means for periodically discharging a portion of the water from the chamber, a valve controlling the air drawing means, a valve controlling the water introducing and discharging means, and means for actuating both valves whereby the vacuum within the chamber is destroyed and the supply of water cut off and a portion of the water within the chamber is discharged.

13. An apparatus of the character described, comprising an air tight chamber, means for periodically introducing clean water therein, means for periodically drawing dust laden air through the water and creating a partial vacuum within the chamber, a valve controlling the air drawing means, a valve controlling the water introducing means, and means for actuating both valves including a device moved by the water.

14. An apparatus of the character described, comprising an air tight chamber, means for introducing water therein, means for drawing dust laden air through the water and creating a partial vacuum within the chamber, an automatically operated valve controlling the air drawing means and automatically operated means for actuating both valves whereby the vacuum within the chamber is destroyed and the supply of water cut off including a device moved by the water.

15. An apparatus of the character described, comprising an air tight chamber, means for introducing water therein, means for drawing dust laden air upward through the water in the chamber and creating a partial vacuum within the chamber, a valve controlling the air drawing means, a valve controlling the water introducing means, and means for actuating both valves whereby the vacuum within the chamber is destroyed and the supply of water cut off and a portion of the water within the chamber is discharged, including a device moved by the water.

16. A wet separator for vacuum cleaning apparatus comprising a separating chamber, means for supplying water thereto, means for introducing air below the water level, means for creating a partial vacuum above the water level and means located within the water whereby the bubbles formed are broken up.

17. A wet separator for vacuum cleaning apparatus comprising a separating chamber, means for supplying water thereto, means for introducing air below the water level, means for creating a partial vacuum above the water level and means located above the air inlet and below the water level for breaking up bubbles.

18. A wet separator for vacuum cleaning apparatus comprising a separating chamber, means for supplying water thereto, a valve adapted to control the same, a discharge pipe, a check valve located therein, means for introducing air below the water level, means for creating a partial vacuum above the water level within the separator, automatic means for breaking the vacuum and means for closing the water supply pipe when the vacuum is broken.

19. A wet separator for vacuum cleaning apparatus comprising a separating chamber, means for supplying water thereto, a valve adapted to control the same, a discharge pipe, a check valve located therein, means for introducing air below the water level, means for creating a partial vacuum above the water level within the separator, automatic means for breaking the vacuum and means for closing the water supply pipe when the vacuum is broken consisting of a connection between the water controlling valve and the interior of the separator.

20. A wet separator for vacuum cleaning apparatus comprising a separating chamber, means for supplying water thereto, a valve adapted to control the same, a diaphragm adapted to move the valve, means for retracting it to position after such movement, a connection between the diaphragm and the interior of the separator, means for producing a partial vacuum within the separator and automatic means for breaking the vacuum whereby when the vacuum is created the valve is opened, and when the vacuum is broken the valve is closed, automatically.

21. In a device of the character described, a water holding chamber, means for supplying water thereto including an inlet pipe and a valve therein, means for discharging water therefrom including an outlet pipe and a valve therein, means for creating a partial vacuum within the chamber, and means actuated by the movement of the water for destroying and recreating said vacuum whereby the water after rising to a predetermined level is shut off and discharged and after falling to a predetermined level is supplied again automatically.

22. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve.

23. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve directly and the water inlet control valve indirectly.

24. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve in combination with means for guiding the float.

25. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve in combination with means for limiting the travel of the float.

26. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve in combination with means for breaking bubbles forming in the water.

27. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve in combination with means for breaking bubbles forming in the water consisting of a framework having fins or projections.

28. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve in combination with means for guiding the float consisting of a framework provided with means for breaking the bubbles formed in the water.

29. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve by means including a liftable valve rod.

30. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve by means including a liftable valve rod provided with stop members adapted to engage suitable parts of the float.

31. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, a rod adapted by its movement to operate the suction pipe valve and a float within the chamber adapted to engage the rod.

32. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, a rod adapted by its movement to operate the suction pipe valve and a float within the chamber adapted to engage the rod to move it to close the suction pipe when the water within the chamber rises to a predetermined level.

33. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, a rod adapted by its movement to operate the suction pipe valve and a float within the chamber adapted to engage the rod to move it to close the suction pipe when the water within the chamber rises to a predetermined level and to open the suction pipe when the water falls to a predetermined level.

34. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve and means for varying the time when the float will act.

35. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, and a float within the chamber adapted to operate the suction pipe controlling valve directly and the water inlet control valve indirectly and means for varying the time when the float will act.

36. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, a rod adapted by its movement to operate the suction pipe valve and provided with engaging stops and a float within the chamber to move along the rod between the stops.

37. A wet separator for vacuum cleaning apparatus comprising a separating chamber, a water inlet, a valve controlling the same, a water outlet, a valve controlling the same, an inlet for dust laden air below the water level, a suction pipe above the water level, a valve controlling the same, a rod adapted by its movement to operate the suction pipe valve and provided with engaging stops and a float within the chamber to move along the rod between the stops, and means for varying the position of either stop along the rod.

38. A separator for vacuum cleaning apparatus comprising a separating chamber, a suction pipe leading therefrom and through which air may be drawn to create a partial vacuum within the separating chamber, means for controlling the suction pipe including a chamber communicating with the pipe, a chamber communicating with the separating chamber, by a passage between these two chambers last mentioned and an air-operated valve adapted to close the passage.

39. A separator for vacuum cleaning apparatus comprising a separating chamber, a suction pipe leading therefrom and connected therewith by a passage through which air may be drawn to create a partial vacuum within the separating chamber, means for introducing water into the separating chamber, a valve adapted to control the passage and a second valve adapted to admit or exclude air under pressure greater than that within the suction pipe to or from the outside of the first valve actuated directly from the rising and falling of the water.

40. A separator for vacuum cleaning apparatus comprising a separating chamber, a suction pipe leading therefrom and connected therewith by a passage through which air may be drawn to create a partial vacuum within the separating chamber, a valve adapted to control the passage and means for introducing air under greater pressure than that within the suction pipe and separating chamber to move against said valve to close it.

41. A separator for vacuum cleaning apparatus comprising a separating chamber, a suction pipe leading therefrom and connected therewith by a passage through which air may be drawn to create a partial vacuum within the separating chamber, means for introducing water into the separating chamber, a valve adapted to control the passage, and means for introducing air under greater pressure than that within the suction pipe and separating chamber to move against said valve to close it operated by the movement of the water in the separating chamber.

42. In a device of the character described, a separating chamber, a suction pipe connected therewith by a passage, means for controlling the passage consisting of a valve, a chamber back of it, and means for admitting air under a greater pressure than that within the suction pipe to the said chamber.

43. In a device of the character described, a separating chamber, a suction pipe connected therewith by a passage, means for controlling the passage consisting of a valve, a chamber back of it, and means for admitting air under a greater pressure than that within the suction pipe to the said chamber, said means consisting of an annular valve adapted to be moved from within the separating chamber.

44. In a device of the character described, a separating chamber, a suction pipe connected therewith by a passage, means for controlling the passage comprising a valve adapted to close the passage, an air chamber back of the valve, a by-pass between the same and the suction pipe having an opening from the same to the outer air and a valve having ports registering with the by-pass and the air opening.

45. In a device of the character described, a separating chamber, a suction pipe connected therewith by a passage, means for controlling the passage comprising a valve adapted to close the passage, an air chamber back of the valve, a by-pass between the same and the suction pipe, an opening from the same to the outer air and a valve having ports registering with the by-pass and the air opening, and means for moving the valve.

46. In a device of the character described, a separating chamber, a suction pipe connected therewith by a passage, means for controlling the passage comprising a valve adapted to close the passage, an air chamber back of the valve, a by-pass between the same and the suction pipe, an opening from the same to the outer air and a valve having ports registering with the by-pass and the air opening in combination with an air inlet to the separating chamber and a supplemental valve adapted to control the same.

47. In a device of the character described, a separating chamber, a suction pipe connected therewith by a passage, means for controlling the passage comprising a valve adapted to close the passage, an air chamber back of the valve, a by-pass between the same and the suction pipe, an opening from the same to the outer air and a valve having ports registering with the by-pass and the air opening in combination with an air inlet to the separating chamber and a supplemental valve adapted to control the same and moved by the main valve.

48. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits.

49. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits in combination with means for operating it moved by the movement of the water within the separating chamber.

50. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits, a conduit leading from the outer air to the water containing chamber and a third valve adapted to open and close said conduit and moving in unison with the second valve.

51. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits and which second valve is operated through a float in the water containing chamber.

52. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits and means for moving the second valve consisting of a trip, a weighted lever, a rod adapted to move the lever and a float moving on the water in the water containing chamber and adapted to move the rod.

53. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits and means for moving the second valve consisting of a valve rod and a float to actuate the same moved by the water in the water containing chamber.

54. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits and means for moving the second valve consisting of a trip, a weighted lever, a rod adapted to move the lever and a float moving on the water in the water containing chamber and adapted to move the rod as the water rises and falls, at predetermined points in its travel.

55. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits and means for moving the second valve consisting of a trip, a weighted lever, a rod adapted to move the lever and a float moving on the water in the water containing chamber and adapted to move the rod as the water rises and falls at predetermined points in its travel in combination with means for varying the limits of such travel.

56. A wet separator comprising a chamber adapted to contain water, an air inlet below the water level, an air outlet and suction pipe above the water level, a valve located between the air outlet and the water containing chamber, an air chamber back of the valve with a conduit leading therefrom to the outer air and a second conduit leading therefrom to the suction pipe and a second valve adapted to open and close both conduits, means for moving the second valve consisting of a trip, a weighted lever, a rod adapted to move the lever and a float moving on the water in the water containing chamber and adapted to move the rod as the water rises and falls at predetermined points in its travel in combination with means for varying the limits of such travel including movable stops arranged on the rod one above and another below the float.

57. A vacuum cleaner comprising a vacuum and water chamber, a suction outlet through which to create a vacuum tension in the chamber, a water inlet pipe to said chamber, a valve in said pipe held open by the vacuum tension, and a float in said water and vacuum chamber for controlling the vacuum tension.

58. A vacuum cleaner comprising a vacuum chamber, a suction outlet from the chamber through which to create a vacuum tension therein, an ingress pipe for leading the cleanings into the water in the chamber, a valve for controlling the flow through the ingress pipe to the chamber adapted to be held open by the vacuum tension and to be closed by the weight of the water in the chamber when the tension is released, a water supply pipe, a valve therein, and a float in the water and vacuum chamber controlling the valve in the water supply pipe.

59. The combination, in a vacuum cleaner, of a vacuum and water chamber, a suction outlet from the chamber through which to create a vacuum tension therein, an ingress pipe for leading the cleanings into the water in the chamber, and a valve for controlling the flow through the ingress pipe to the chamber adapted to be held open by the vacuum tension therein and to be closed by the weight of the water in the chamber when the vacuum tension is released.

In testimony whereof I affix my signature in presence of two witnesses.

HOWARD D. YATES.

Witnesses:
WILLIAM C. BRYANT,
CHARLES C. MCCAFFERTY.

Copies of this patent may be obtained for five cents each, by addressing the "Commissioner of Patents, Washington, D. C."